Nov. 12, 1968  J. B. SLEVIN, JR  3,410,596
BOTTLE CARRIER

Filed May 16, 1967  5 Sheets-Sheet 1

INVENTOR.
JULIAN B. SLEVIN, JR.
BY
Paul + Paul
ATTORNEYS.

Nov. 12, 1968  J. B. SLEVIN, JR  3,410,596
BOTTLE CARRIER
Filed May 16, 1967  5 Sheets-Sheet 2

INVENTOR.
JULIAN B. SLEVIN, JR.
BY
Paul + Paul
ATTORNEYS.

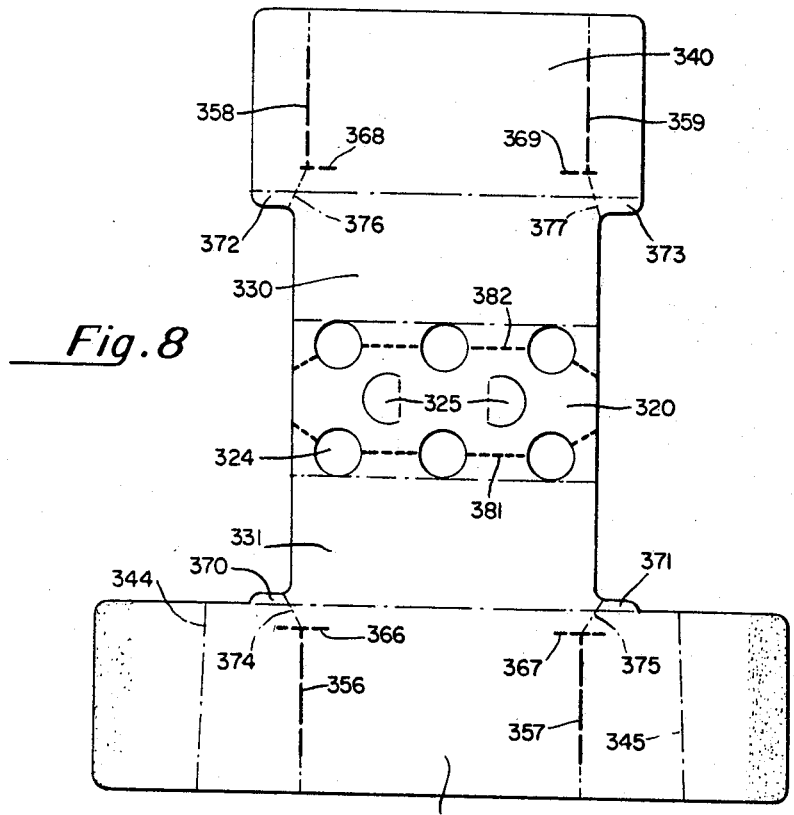
Fig. 8
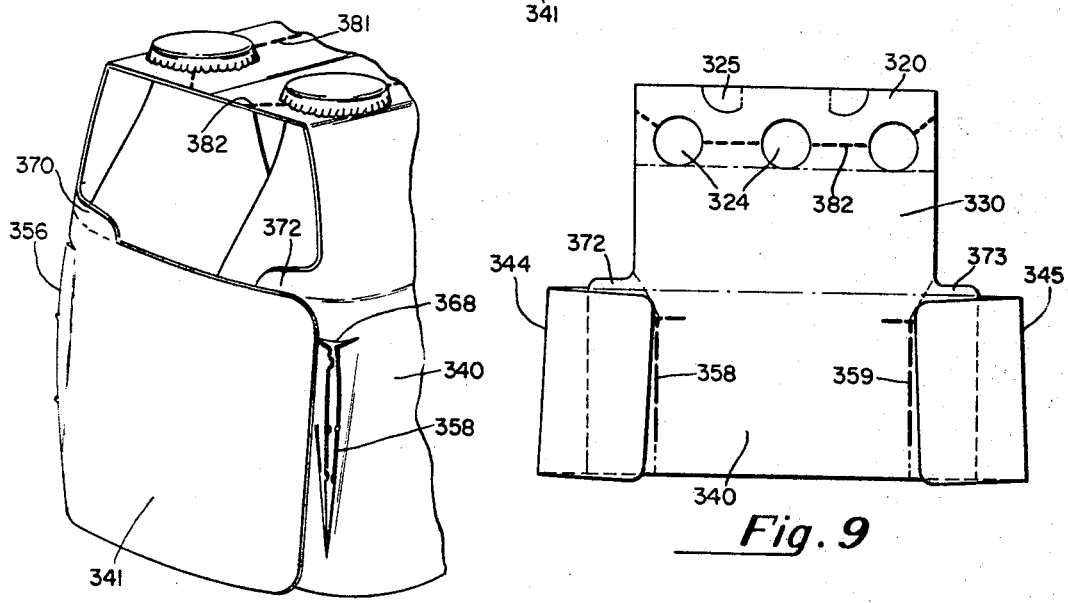
Fig. 10
Fig. 9
INVENTOR.
JULIAN B. SLEVIN, JR.
BY
Paul + Paul
ATTORNEYS.

Nov. 12, 1968  J. B. SLEVIN, JR  3,410,596
BOTTLE CARRIER
Filed May 16, 1967  5 Sheets-Sheet 5

INVENTOR.
JULIAN B. SLEVIN, JR.
BY
Paul + Paul
ATTORNEYS.

United States Patent Office 3,410,596
Patented Nov. 12, 1968

3,410,596
BOTTLE CARRIER
Julian B. Slevin, Jr., 3004 Hermosa Drive,
Havertown, Pa. 19083
Filed May 16, 1967, Ser. No. 638,845
5 Claims. (Cl. 294—87.2)

ABSTRACT OF THE DISCLOSURE

A paperboard carrier for a pack of "no return" bottles. The carrier has no bottom. It grips and supports the bottles under the flared skirts of the bottle caps, and includes an integral wrap-around band portion which encircles the sides of the bottles, at least at the shoulder area, to prevent swinging and banging of the bottles. The wrap-around band portion is connected to the top cap-gripping finger-hole portion by a sloping inclined portion which (when the bottle pack is lifted by grasping the wrap-around band portion with both hands instead of by the finger holes in the top portion) functions to direct the lifting force to the bottle caps. Provision is also made for the variations which occur, within manufacturing tolerances, in bottle diameters of nominally the same size bottles, by making the wrap-around band portion slightly conical, with the larger dimension at the bottom, and by providing pre-cut break-outs at the four corners of the wrap-around at the shoulder height of the bottles.

Field of the invention

This invention relates to paperboard bottle carriers, and particularly to carriers of a pack of beverage bottles of the "no return" type. "No return" bottles are beverage bottles of inexpensive glass for which no deposit is required by the store, and which are not carried back to the store for credit.

Summary of the invention

The amount of paperboard material used in a bottle carrier for a cluster or pack of beverage bottles may be substantially reduced by not providing any material for supporting the bottoms of the bottles and by designing the carrier to grip and support the bottles under the skirts of the caps. Such type of carrier is suitable for "no return" bottles since such bottles when empty and capless are not carried back to the store for credit. However, bottle carriers which support glass bottles by their caps are not commercially satisfactory if they permit the bottles to swing and to bang together.

The present invention provides a paperboard carrier which supports a cluster of bottles, for example, a six-pack, by gripping the bottles under the skirts of the caps. The carrier has an integral wrap-around band portion which encircles the bottles at least at the shoulder area and keeps them in firm, parallel, side-by-side engagement with each other, thereby avoiding bottle separation and the banging and clanging which accompanies bottle separation. The wrap-around band portion is connected to the top cap-gripping portion by a sloping inclined portion which directs the lifting force to the bottle caps when the pack is lifted by grasping the wrap-around band with both hands instead of by the finger holes in the top.

Commercially manufactured bottles of the same type and size actually vary in dimensions within manufacturing tolerances. If, for a group of six (or more) bottles, the variations in outside diameters all happen to be in the same direction, the total wrap-around or peripheral dimension of the six (or more) bottles where the diameters are all at the upper tolerance limit will be substantially greater than the wrap-around dimension of six bottles all of which are at the lower tolerance limit. To provide for such variation, the preferred form of bottle carrier, according to the present invention, has a slightly conical wrap-around band, with pre-cut break-outs provided at the four corners at the shoulder height of the bottles.

Brief description of the drawing

FIG. 8 is a plan view of another form of carrier blank in flat form. This is the presently preferred form;

FIG. 9 is a plan view showing the blank of FIG. 8 in folded and glued form, but still flat;

FIG. 10 is a perspective view of a portion of the carrier of FIGS. 8 and 9 in erected form showing the controlled break-out at the corner of the wrap-around when the bottle diameters are all or mostly at the upper limit of manufacturing tolerance;

Description of the preferred embodiments

Figure 1:
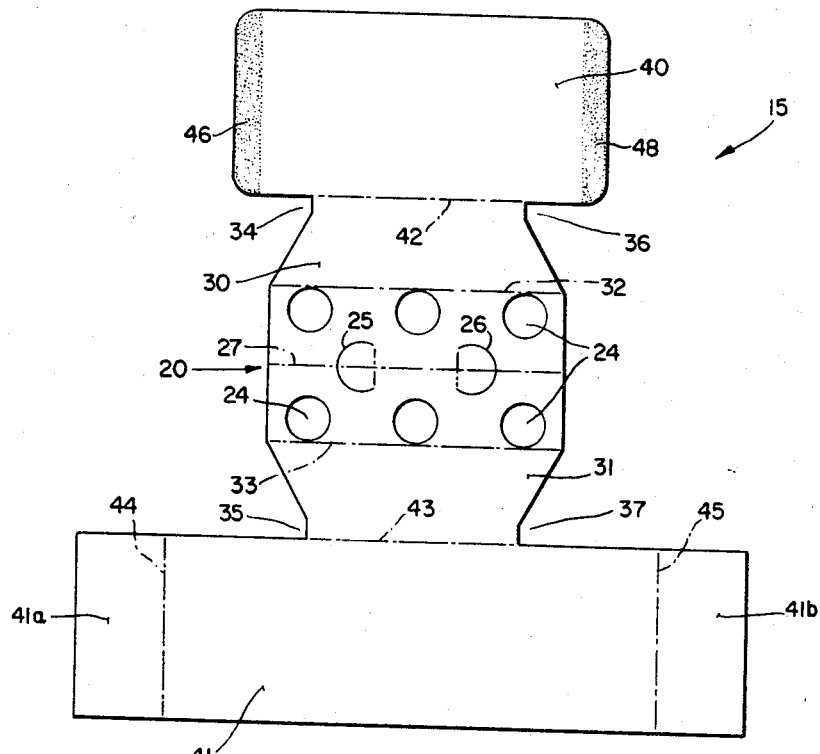
FIG. 1 is a plan view of one form of carrier blank in flat form, according to the present invention.

Referring now to FIG. 1, there is shown a flat blank 15 of paperboard (or other suitable sheet material) cut and scored and capable of being erected to form a carrier for six "no return" bottles. The blank 15 has a central portion 20 which, when the carrier is erected, forms a flat cap-gripping top portion. The blank also has portions 40 and 41 which, when the carrier is erected, form the bottle wrap-around wall portion. The blank also has portions 30 and 31 which interconnect the cap-gripping top portion 20 and the bottle wrap-around portions 40 and 41. When the bottle carrier is erected, the interconnecting portions 30 and 31 incline downwardly and outwardly, as seen best in the diagrammatic end view of FIG. 3 and also in the perspective views of FIGS. 4 and 5.

The central portion 20 is shown to be provided with six circular holes identified collectively by the reference number 24. The holes 24 are in two rows of three each and are located to be in registry with the necks of the six bottles to be carried. If desired, four, or eight, or some other number of holes may be provided in carriers sized to carry that number of bottles. The diameters of the holes 24 are approximately equal to the diameters of the top surfaces of the bottle caps but are smaller than the diameters of the flared skirt portions of the caps. Thus, when the paperboard carrier 15 is pressed down over the caps of the six bottles, the peripheral edges of the circular holes 24 snap back under the flared skirts of the caps.

The central portion 20 is also provided with two cuts 25 and 26 of truncated circular configuration, forming truncated circular tabs which when pressed downwardly, as by the thumb and middle finger, form finger holes for carrying the 6-pack cluster of bottles.

The blank 15 is scored at various places, indicated by the dot-and-dash lines 27, 32, 33, 42, 43, 44 and 45 of FIG. 1. These scored lines function as fold lines when the blank is erected.

The interconnecting portions 30 and 31 are cut out or notched, as at 34, 35, 36 and 37, to facilitate bending of the end portions 40 and 41 about the bottles to form an encircling band which wraps around and tightly embraces the cluster of bottles.

To erect the blank of FIG. 1, the end portions of side wall portion 40 are first glued at 46 and 48. Then the end portions 41a and 41b of portion 41 are folded inwardly along the vertical score lines 44 and 45. Next, the blank is folded along the center horizontal score line 27, and the glued portions 46 and 48 are pressed against the edge portions of 41a and 41b. The result is illustrated in FIG. 2.

Figure 2:
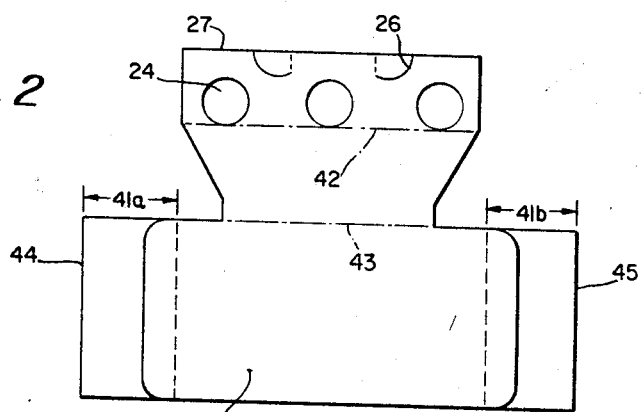
FIG. 2 is a plan view showing the blank of FIG. 1 in folded and glued form, but still flat.
Figure 4:
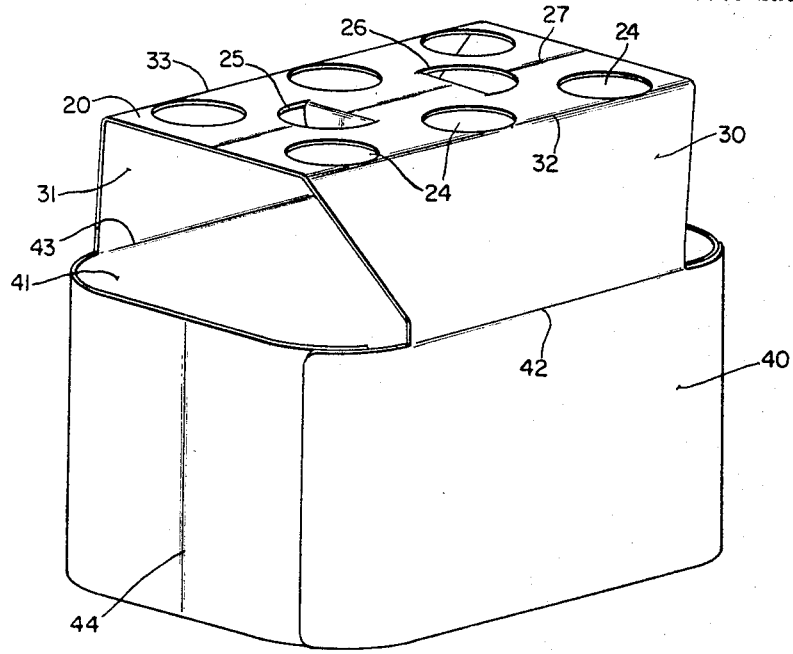
FIG. 4 is an enlarged perspective view of the blank of FIG. 1 in erected form.

When the glued and folded blank of FIG. 2 is erected, the result is a carrier as illustrated in FIG. 4. To simplify the drawing, the bottles are omitted in FIG. 4. It will be understood, however, that the peripheral edges of the circular holes 24 of the top portion 20 snap back under the flared skirts of the bottle caps, and the bottles are carried by their caps. The glued together portions 40, 41, 41a and 41b form a wrap-around band which completely encompasses and tightly embraces the bottles, thereby maintaining the bottles in compact side-by-side relation. Separation of the bottles is prevented, and this avoids the resultant banging and clanging, with possible breakage of the bottle.

Figure 11:
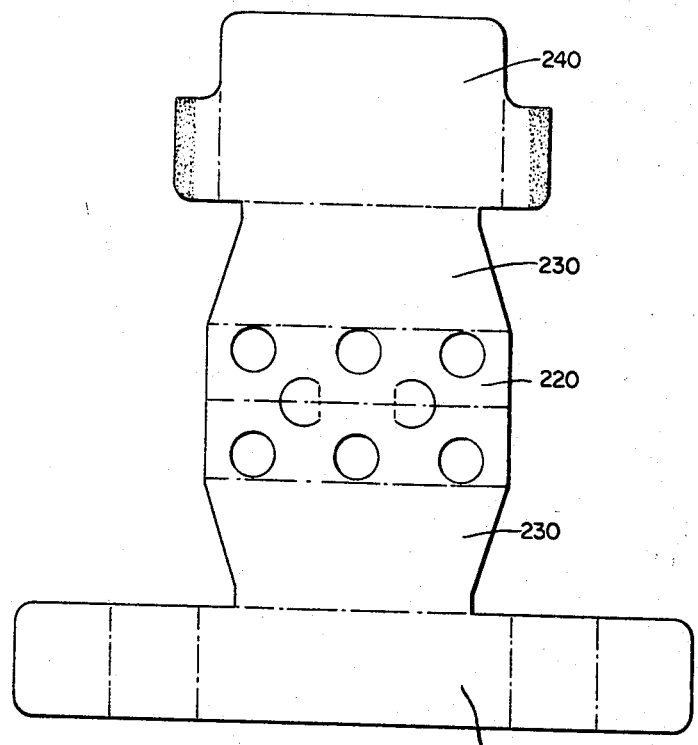
FIG. 11 is a plan view showing a modified form of carrier in which the skirt at one side of the wrap-around is substantially deeper than on the other side.
Figure 12:
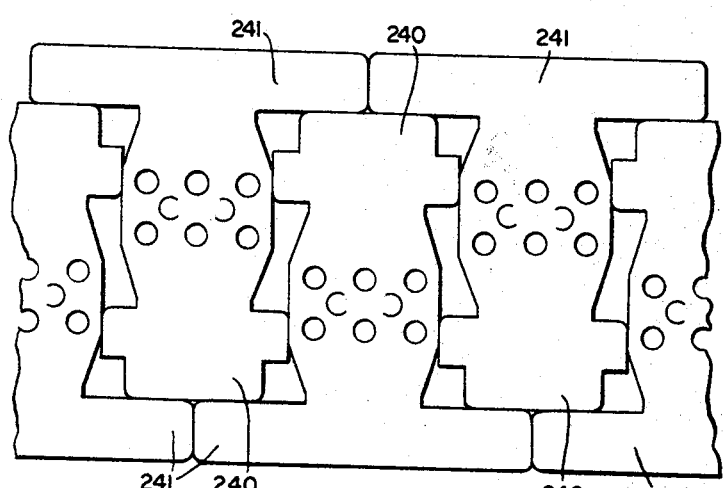
FIG. 12 is a diagram showing a plurality of blanks of the type shown in FIG. 11 laid out on a web of continuous paperboard material to illustrate how efficiently the blanks are nested and how little of the paperboard material is wasted.

The wrap-around band, formed by the portions 40, 41, 41a and 41b, may be relatively wide (in the vertical direction), or relatively narrow or may be of intermediate height, or may be of different heights on opposite sides of the bottles, according to how much of the wrap-around band is wanted for labeling and advertising purposes, and according to whether or not the contents of the bottles require protection from exposure to light. FIGS. 11 and 12 illustrate a carrier blank in which the wrap-around band, when folded and glued, has a wide (high) portion 240 on one side of the bottle pack and a narrow portion 241 on the opposite side. The wide portion 240 is available for labeling and advertising. The narrow portion 241 conserves material. FIG. 12 illustrates how the blanks of FIG. 11 may be nested efficiently on the paperboard web to avoid waste of material.

Figure 5:
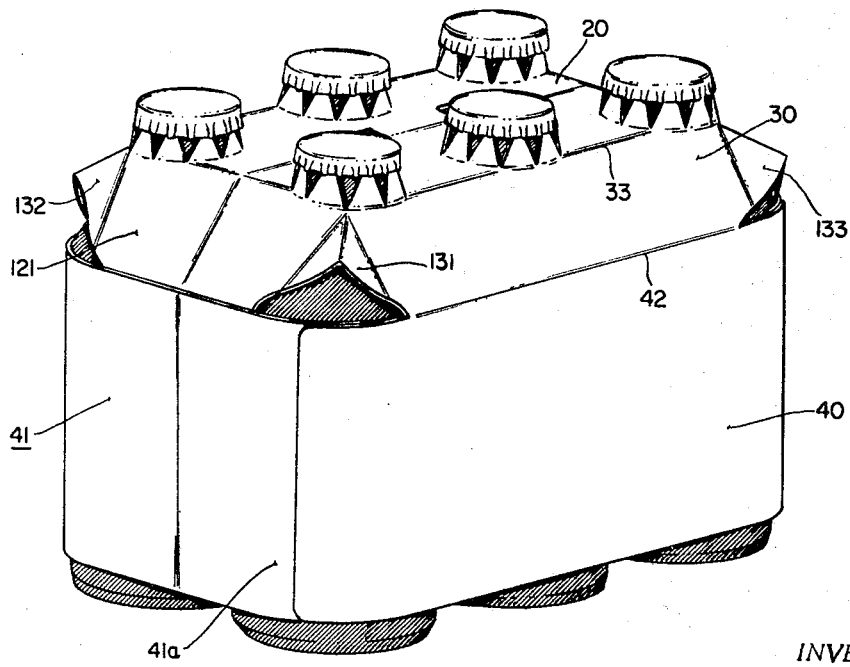
FIG. 5 is an enlarged perspective view of a modified form of carrier showing six bottles in the carrier.
Figure 6:
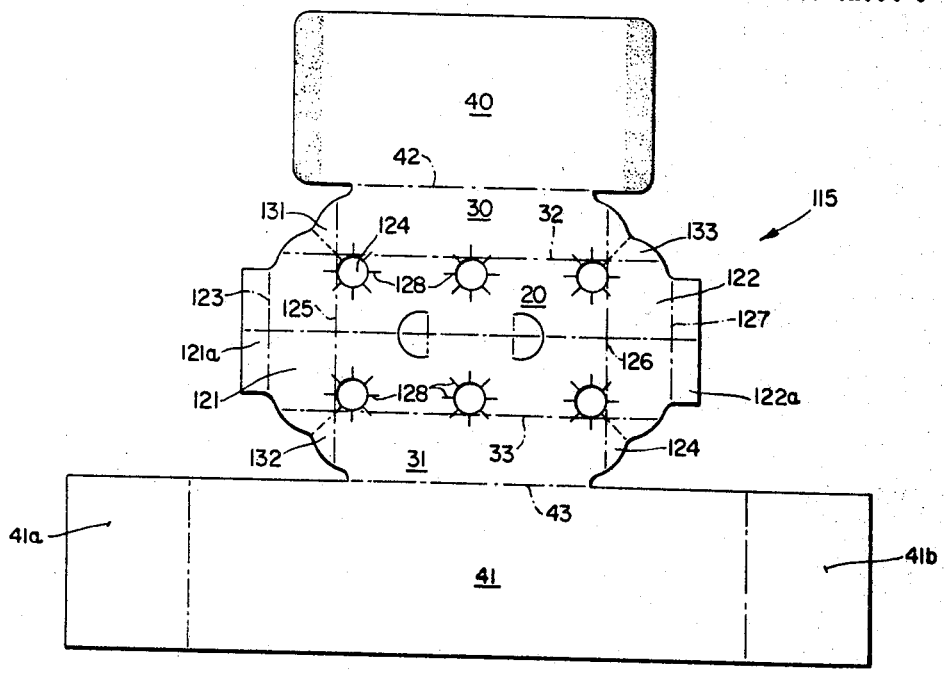
FIG. 6 is a plan view of the carrier of FIG. 5 in flat form.

FIG. 5 illustrates a slightly modified form of carrier, formed from blank 115 shown in FIG. 6. The blank 115 is similar in many respects to blank 115 of FIG. 1, and similar parts have been identified by the same reference numerals used in FIG. 1.

In FIG. 6, the six circular holes in the cap-gripping top 20, identified collectively by the reference numeral 124, are smaller in diameter than the holes 24 of FIG. 1 The holes 124 are also appreciably smaller in diameter than the top surface of the bottle caps. For example, the diameter of holes 124 may be 5/8" while the diameter of the top surface of the bottle cap may be 1". A plurality such as six or eight slits 128 project radially from each of the holes 124, eight slits being shown in FIG. 6 at 45° spacings. When the blank 115 is forced down over the bottles, the eight peripheral sectors formed at each hole by the slits 128 spread up and back as the cap of the bottle passes up through the hole. As soon as the bottle cap has cleared, the sectors snap back under the flared skirt of the cap, as is illustrated in FIG. 5.

In the carrier of FIGS. 5 and 6, the inclined interconnecting portions 30, 31 are shorter, i.e., narrower, thereby to accommodate bottles having a different shape (shorter neck and broader shoulders) than the bottles for which the carrier of FIG. 1 is designed.

Another difference between the carrier blanks of FIGS. 1 and 6 is that the center or top portion 20 of the blank of FIG. 6 is substantially longer in the axial direction of the carton. The extended portions of top portion 20, beyond the nest of holes 124, are identified in FIG. 6 by the reference numerals 121, 121a, 122 and 122a. The longitudinal score lines 32 and 33 extend the full length. Score lines in the transverse direction are provided at 123, 125, 126, and 127. The score lines 125 and 126 cross and extend beyond the longitudinal score lines 32 and 33, forming the four corner areas 131, 132, 133 and 134. Each of these corner areas is divided by a diagonal score line into two equal areas.

The transverse score lines 123 and 127 form end tabs 121a and 122a.

The blank of FIG. 6 is folded and glued in the same manner as the blank of FIG. 1. The blank is then spread open and is then pressed down over the cluster of six bottles to form the carrier shown in FIG. 5. The bottle caps and necks project through the sun-burst holes 124, and the sectors of material at the peripheral edges of the holes snap back under the flared skirts of the bottle caps to grip and support the bottles. The glued-together wall portions 40, 41, 41a and 41b form a wrap-around band which completely surrounds and tightly embraces the cluster of bottles. The interconnecting portions 30 and 31 incline downwardly outwardly, and so do the portions 121 and 122. The end tabs 121a and 122a are tucked vertically downward between the bottles and the band.

As illustrated in FIG. 5, the blank 115 of FIG. 6 is designed to provide a high percentage of coverage for the bottles, thereby protecting the contents (for example, beer) from the damaging effects of exposure to sun and light.

Figure 3:
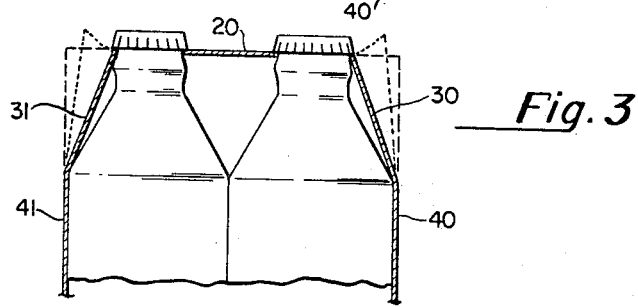
FIG. 3 is a diagrammatic and elevational view to bring out the importance of the inclined portions which interconnect the flat cap-gripping top portion and the vertical wrap-around band or wall portions.

Referring now FIG. 3 which is a diagrammatic end elevational view of the carrier of either FIG. 4 or FIG. 5, it will be seen that if the 6-pack is lifted, not by the finger holes, but by grasping the wrap-around portion with both hands (as will frequently happen in actual use), the inclined portions 30 and 31 function to direct the lifting force to the bottle caps and the wrap-around portion cannot move upward relative to the bottles. This is in contrast to that which would occur if, as in the prior art carriers, the top surface of the carrier were to extend outwardly to the vertical wall portions, as illustrated in FIG. 3 by the dashed lines. In the latter case, if the 6-pack is lifted by grasping the wrap-around wall portion 40, 41, the wall portion will slip upwardly relative to the bottles in the direction of turning the paperboard carrier partially inside out, as indicated by the dotted line in FIG. 3. This releases an increased lower area of the bottle cluster from the confining embrace of the wrap-around band and allows the lower ends of the bottles to swing out. This undesirable effect does not occur when the inclined interconnections 30, 31 are employed.

Figure 7:
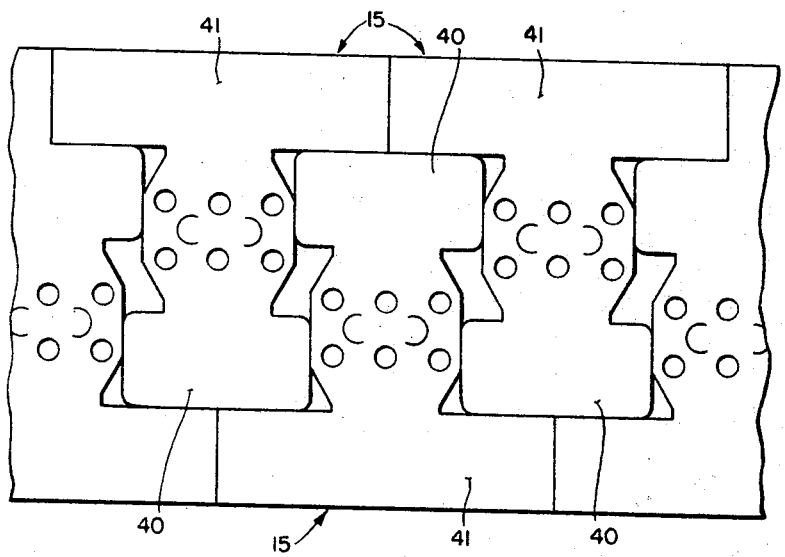
FIG. 7 is a diagram showing a plurality of blanks, of the type shown in FIG. 1, laid out on a web of continuous paperboard material to illustrate the high percentage of web material which is utilized and to show how little is wasted.

Attention is now invited to FIG. 7 which shows several carrier blanks of the type of FIG. 1 laid out on a web of continuous paperboard supply. The web may be twice as wide, or three times as wide, as that shown in FIG. 7 in which case the arrangement of the carrier blanks on the web is reproduced the necessary number of times transversely of the web.

In FIG. 7, the web has a width which exceeds the width of one carrier blank by the width of the wrap-around band. The wrap-around band is formed of two portions 40 and 41 of equal lengths. The length of the longer portion 41 is equal to the length of the shorter portion 40 plus the length of the top portion 20. This allows the blanks to be intermeshed on the web of continuous paperboard supply in the manner shown in FIG. 7. It will be seen that a high percentage of the paperboard is utilized and very little wasted.

FIGS. 8, 9 and 10 show a modified, and presently preferred, form of bottle carrier. The carrier shown in FIGS. 8–10 is generally similar to the carriers previously described hereinabove but differs in several respects which will now be discussed. In FIGS. 8–10, the vertical dot-and dash fold lines 344, 345 of the wrap-around portion 341 are inclined outwardly from top toward the bottom. The extent of the inclination is such that the peripheral dimension of the bottom edge of the wrap-around portions 341 and 340, when folded and glued as in FIG. 9, is just large enough to fit around a cluster of bottles (a 6-pack will be assumed) each of which has an outside diameter which is at the upper limit of manufacturing tolerance. The peripheral dimension at the upper edge of the wrap-around is smaller, and of a size to fit snugly around the 6-pack when each of the bottles has an outside diameter which is at the lower limit of manufacturing tolerance.

To accommodate a group of bottles, at least one of which, or all of which, may have an outside diameter at the upper limit of tolerance, the carrier of FIGS. 8–10 is provided with a controlled break-out feature which will now be described. The wrap-around portions 340 and 341 of the blank of FIG. 8 are provided, preferably at the four locations corresponding to the four corners of the wrap-around of the erected carrier, with T-shaped pre-cuts, comprising the vertical pre-cuts 356–359 and the cross pre-cuts 366–369, shown in FIGS. 8–10 by heavy dash lines. The pre-cuts are preferably in the form of interrupted cuts or slits joined together by very short breakaway portions. The lower end of each of the vertical cuts 356–359 is substantially above the lower edge of the wrap-around. The cross pre-cuts 366–369 are located at the upper end of the vertical pre-cuts, below the upper edge of the wrap-around, and at the shoulder level of the bottles. Thus, when the folded and glued carrier blank (FIG. 9) is opened and pressed down over a cluster of bottles all or some of which have outside diameters which are at the upper limit of the manufacturing tolerance, the peripheral dimension of the cluster of bottles exceeds the peripheral dimension of the wrap-around at the upper portion of the conical wrap-around, and as a consequence the wrap-around portion of the carrier ruptures and breaks out at the four corners along the vertical pre-cuts 356–359, as illustrated in FIG. 10. The rupture or break-out is, however, of a controlled nature, since the major stress is at the upper portion of the wrap-around but below the point where the bottle begins to taper. It is here that the cross cuts 366–369 are located. Thus, the cross cuts, by allowing the paperboard to break open along the horizontal line of the cross cut, prevents the rupture or tear from extending above the cross-cut.

FIG. 10 may be assumed to illustrate a substantial or maximum rupture or break-out. Where the peripheral dimension of the six bottles is minimum, the wrap-around will not rupture at all. Where the peripheral dimension of the six bottles is greater than minimum but less than maximum, the rupture will be less than illustrated in FIG. 10. Where a rupture occurs, it will, ordinarily at least, occur at each of the four corners of the wrap-around, i.e., along each of the pre-cuts 356–359.

To strengthen the carrier of FIGS. 8–10 in the region above the pre-cuts, the sections 330 and 331, which interconnect the wrap-around portions 340, 341 to the top portion 320, are not cut out or notched (as was the case in FIG. 1 at 34, 35, 36 and 37). To the contrary, the sections 330 and 331 are provided with ear portions, as at 370–373 and scored fold lines, as at 374–377, are provided to facilitate bending the wrap-around portions at the four corners. For the same purpose, scored fold lines may also be provided below the vertical pre-cuts 356–359 in line therewith.

To assist in opening the carrier to remove a bottle, the carrier blank shown in FIGS. 8–10 is provided with partially cut interrupted tear lines 381 and 382, represented in the drawing by the heavy short dashes. This feature is not new and constitutes no part of the invention claimed.

While I prefer that the conical wrap-around band have its larger diameter at the lower edge, it may be advantageous in some cases to make a bottle carrier in which the conical wrap-around is inverted, that is, in which the smaller diameter is at the lower edge. In such case, the pre-cut break-outs would extend down to the lower edge of the wrap-around. A pack of bottles of minimum-tolerance diameters would be snugly embraced at the lower edge of the wrap-around but not at the upper edge. No break-out would occur at either edge. A pack of bottles of maximum-tolerance diameters would, however, break-out the wrap-around at the four corners at the lower edge portion, but not at the upper edge portion.

What is claimed is:

1. A bottomless paperboard carrier for a cluster of capped bottles, said carrier having:
    (a) a horizontal top portion having bottle-cap-gripping apertures therein, the side edges of said top portion being substantially tangent with the bottle-cap-gripping apertures;
    (b) a wrap-around sidewall portion; and
    (c) inclined upwardly-convergent means connecting top edges of the sidewall portion with side edges of the top portion for preventing slide-up of the sidewall portion,
    (d) said wrap-around sidewall portion being divergent so as to embrace a larger cross-sectional area at one edge of said sidewall portion than at the other,
    (e) said wrap-around sidewall portion being provided with pre-cut break-out lines at locations corresponding to the four corners of the wrap-around sidewall portion.

2. A bottomless paperboard carrier for a cluster of capped bottles, said carrier having:
    (a) a horizontal top portion having bottle-cap-gripping apertures therein, the side edges of said top portion being substantially tangent with the bottle-cap-gripping apertures;
    (b) a wrap-around sidewall portion; and
    (c) inclined upwardly-convergent means connecting top edges of the sidewall portion with side edges of the top portion for preventing slide-up of the sidewall portion,
    (d) said wrap-around sidewall portion being divergent downwardly so that the sidewall portion embraces a larger area at its bottom edge than at its top edge,
    (e) said wrap-around sidewall portion being provided with pre-cut break-out lines at locations corresponding to the four corners of the wrap-around sidewall portion.

3. A bottomless paperboard carrier according to claim 2 characterized in that the pre-cut break-out lines comprise interrupted vertical pre-cut slits extending from above the lower edge of the wrap-around sidewall portion to below the upper edge of the wrap-around sidewall portion, and further characterized in the provision of a lateral pre-cut slit at the upper end of the vertical pre-cut slits.

4. A bottle carrier having:
    (a) a flat horizontal bottle-cap-gripping top portion,
    (b) vertical wrap-around sidewall portions, and
    (c) divergently downwardly portions interconnecting top edges of the sidewall portions with outer edges of the top portion,
    (d) said top portion having therein a plurality of holes adapted for registry with the capped neck portions of the bottles to be carried, (e) said wrap-around sidewall portions being divergent downwardly to form a conical wrap-around band, (f) said wrap-around sidewall portions being provided with pre-cut break-out lines at locations corresponding to the four corners of the wrap-around band.

5. A bottle carrier according to claim 4 characterized in that the pre-cut break-out lines comprise interrupted pre-cut vertical slits extending from above the lower edge to below the upper edge of the wrap-around band, and a lateral pre-cut slit at the upper end of the vertical pre-cut slits.

References Cited

UNITED STATES PATENTS

| | | | |
|---|---|---|---|
| 3,348,671 | 10/1967 | Wood | 206—65 |
| 2,737,326 | 3/1956 | Toensmeier | 294—87.2 |
| 2,823,063 | 2/1958 | Toensmeier | 294—87.2 |
| 3,016,259 | 1/1962 | Lawrence | 294—87.2 |
| 3,121,523 | 2/1964 | Hasselo | 206—65 |
| 3,156,358 | 11/1964 | Randrup | 206—65 |

EVON C. BLUNK, *Primary Examiner.*

R. D. GUIOD, *Assistant Examiner.*